United States Patent
Del Signore et al.

(10) Patent No.: US 8,027,693 B2
(45) Date of Patent: *Sep. 27, 2011

(54) CONSERVATION OF PAGING RESOURCES IN A MOBILE SWITCHING CENTER

(75) Inventors: Kenneth W. Del Signore, North Aurora, IL (US); Jenq-Yann W. Ku, Westmont, IL (US)

(73) Assignee: Alcatel Lucent, Paris (FR)

( * ) Notice: Subject to any disclaimer, the term of this patent is extended or adjusted under 35 U.S.C. 154(b) by 506 days.

This patent is subject to a terminal disclaimer.

(21) Appl. No.: 11/455,514

(22) Filed: Jun. 19, 2006

(65) Prior Publication Data

US 2007/0293245 A1     Dec. 20, 2007

(51) Int. Cl.
*H04W 4/00*     (2009.01)

(52) U.S. Cl. ............... 455/458; 455/413; 455/435.1; 370/342

(58) Field of Classification Search ............ 455/458, 455/413, 435.1; 370/342
See application file for complete search history.

(56) References Cited

U.S. PATENT DOCUMENTS

| | | | | |
|---|---|---|---|---|
| 5,381,464 | A * | 1/1995 | O'Keefe et al. | 455/458 |
| 5,533,094 | A * | 7/1996 | Sanmugam | 455/426.1 |
| 5,918,177 | A * | 6/1999 | Corriveau et al. | 455/432.3 |
| 6,097,951 | A * | 8/2000 | Ernam et al. | 455/433 |
| 6,108,518 | A * | 8/2000 | Madour et al. | 340/7.25 |
| 6,285,880 | B1 * | 9/2001 | Gagnon et al. | 455/432.1 |
| 2002/0147010 | A1 * | 10/2002 | Cruz et al. | 455/426 |
| 2002/0151307 | A1 * | 10/2002 | Demarez et al. | 455/445 |
| 2005/0096006 | A1 * | 5/2005 | Chen et al. | 455/400 |
| 2005/0159161 | A1 * | 7/2005 | Florkey et al. | 455/450 |
| 2005/0181767 | A1 * | 8/2005 | Boland et al. | 455/412.2 |
| 2006/0068813 | A1 * | 3/2006 | Ku et al. | 455/458 |
| 2006/0205383 | A1 * | 9/2006 | Rollender | 455/404.1 |
| 2006/0223550 | A1 * | 10/2006 | Zhang et al. | 455/458 |
| 2006/0274640 | A1 * | 12/2006 | Sliva | 370/209 |
| 2007/0077946 | A1 * | 4/2007 | Benco et al. | 455/458 |
| 2007/0105535 | A1 * | 5/2007 | Jacobson et al. | 455/414.1 |

* cited by examiner

*Primary Examiner* — Pierre-Louis Desir
(74) *Attorney, Agent, or Firm* — Carmen Patti Law Group, LLC; John Ligon

(57) ABSTRACT

A method in one example comprises the steps of receiving a call intended for a designated cellular subscriber unit at a serving MSC, determining that the designated cellular subscriber unit, during a recent prior use of the serving MSC, responded to an Intersystem Page (ISPAGE) message from a border MSC, and transmitting an initial paging message to the designated cellular subscriber unit via an ISPAGE message directed toward said border MSC.

23 Claims, 3 Drawing Sheets

US 8,027,693 B2

CONSERVATION OF PAGING RESOURCES IN A MOBILE SWITCHING CENTER

BACKGROUND

This application is directed generally to a telecommunications system and in particular to a wireless telecommunications system comprised of multiple mobile switching centers (MSCs), and is more particularly directed toward conservation of paging resources and reduction of call delivery times.

In a wireline telecommunications system, such as the public switched telephone network (PSTN), the process of delivering a telephone call from a calling party to a call recipient is relatively straightforward. Since the directory number (DN) of the call recipient is provisioned to a pair of wires coupled to a central office (CO), it is simply necessary for the CO to establish a connection to the call recipient's telephone set and activate a ringing signal.

Call delivery in a wireless system, such as a cellular telephone system, is necessarily more complex. Since the specific location of a call recipient may not be well known at the time when a call is to be delivered, a cellular system attempts to locate the call recipient through a process known as paging. Since the paging process necessarily precedes every call delivery, a number of dedicated paging channels are generally reserved for this purpose.

When the cellular subscriber unit that is the designated call recipient receives a page message from a mobile switching center, the subscriber unit transmits an acknowledgement message back to the MSC, the MSC designates a voice channel for the call, and directs the subscriber unit to activate an alert signal (simulating the well-known ring of a wireline telephone set) so that call delivery can proceed.

Of course, the MSC may not know precisely where to begin its search for the call recipient. Because of this uncertainty, protocols have been established for multiple page attempts in an effort to locate the call recipient. These multiple pages occupy valuable paging channel bandwidth and extend the time required for call set-up.

SUMMARY

The invention in one implementation encompasses a method. The method comprises the steps of receiving a call intended for a designated cellular subscriber unit at a serving MSC, determining that the designated cellular subscriber unit, during a recent prior use of the serving MSC, responded to an Intersystem Page (ISPAGE) message from a border MSC, and transmitting an initial paging message to the designated cellular subscriber unit via an ISPAGE message directed toward said border MSC.

Another implementation of the invention encompasses an apparatus. The apparatus comprises means for receiving a call intended for a designated cellular subscriber unit at a serving MSC, means for determining that the designated cellular subscriber unit, during a recent prior use of the serving MSC, responded to an Intersystem Page (ISPAGE) message from a border MSC, and means for transmitting an initial paging message to the designated cellular subscriber unit via an ISPAGE message directed toward said border MSC.

DETAILED DESCRIPTION

The system of the present invention conserves paging resources in a Mobile Switching Center (MSC) and also reduces call delivery time. The process described herein acts to more efficiently and quickly find a specific mobile telephone at call delivery time by recording mobile-specific data about past call deliveries.

Paging channel occupancy is a recognized bottleneck to handling a large number of busy hour call attempts, or BHCA. In order to increase capacity, a new database is introduced pursuant to the present invention. In addition to other information, this database includes records identifying each mobile that has responded to an Intersystem Page (ISPAGE) message. Each record specifically identifies the border MSC from which a specific mobile responded. Subsequent incalls to that mobile result in an ISPAGE to the identified MSC on the first page attempt.

As a general principal, cells in a cellular telephone system are grouped into LAs, or Location Areas. Every LA has a Location Area Cluster, or LAC, which is a list of LAs containing that LA plus every LA or MSC that borders it. When a call is to be delivered to a mobile, three page attempts are generally used. The first page attempt will page all of the cells in the last seen LA. The second and third page attempts will page all of the LAs and MSCs in the last seen LA's LAC.

The dominant mechanism whereby a mobile responds in a border MSC is known as "toggling." In a situation where two adjacent cells are served by different MSCs, the mobile will actually toggle its registration between the two MSCs. However, in order to prevent excessive registration, mobiles use a registration hysteresis timer that prevents re-registration during the timer period, which is usually set for three to five minutes. This process has the negative effect that if a call arrives while the destination mobile is toggled to the border MSC, paging in the serving MSC will not find the mobile. Under established protocols, when the first page fails, ISPAGE messages are sent to border MSCs. In some MSCs, paging load due to ISPAGE messages can be comparable to the load due to incalls to the MSC.

Figure 1:
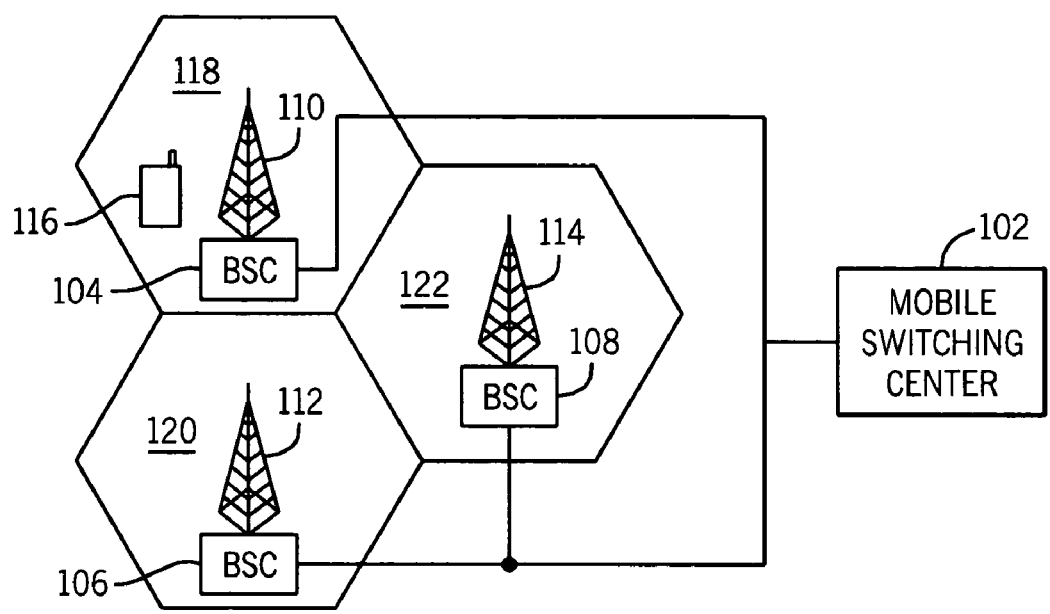
FIG. 1 is a simplified representation of a cellular telecommunications system.

FIG. 1 is a simplified diagram of a cellular telecommunications system having a single MSC 102 that serves a plurality of individual cells 118, 120, 122. Of course, the system may have a much larger number of cells in order to provide adequate service over a large coverage area, but only three cells are illustrated in the figure for the sake of simplicity. Each cell has one or more base stations (not specifically illustrated) that are controlled by a base station controller (BSC) such as BSC 104. A cell 118 also includes an antenna tower 110 that is generally centrally disposed in the cell 118, although multiple antenna locations may be supported to ensure adequate coverage, particularly in problem areas.

When a call arrives at the MSC 102, intended for a designated cellular subscriber unit 116, the MSC may simply broadcast a page message in all of the cells 118, 120, 122 that it serves. The subscriber unit 116 receives the page message in cell 118, transmits the proper acknowledgement message, and the MSC proceeds to designate a voice channel so that call set-up can be completed.

In a larger system, such as a system with multiple MSCs, an incoming call is generally delivered to the serving MSC where the designated cellular subscriber unit (or mobile) was last seen. The serving MSC must locate the mobile via the paging procedure as noted above. In simple terms, the paging process may be described as a group of cell towers broadcasting a "page" message for the particular mobile. If the mobile unit does not respond to the first page message, additional paging attempts may be generated.

On these second and subsequent paging attempts, the serving MSC can send an Intersystem Page (ISPAGE) message to its border MSCs. The ISPAGE message instructs the border MSCs to page the mobile. In some systems, a non-trivial percentage (3-5%) of page responses come via the ISPAGE mechanism.

Figure 2:
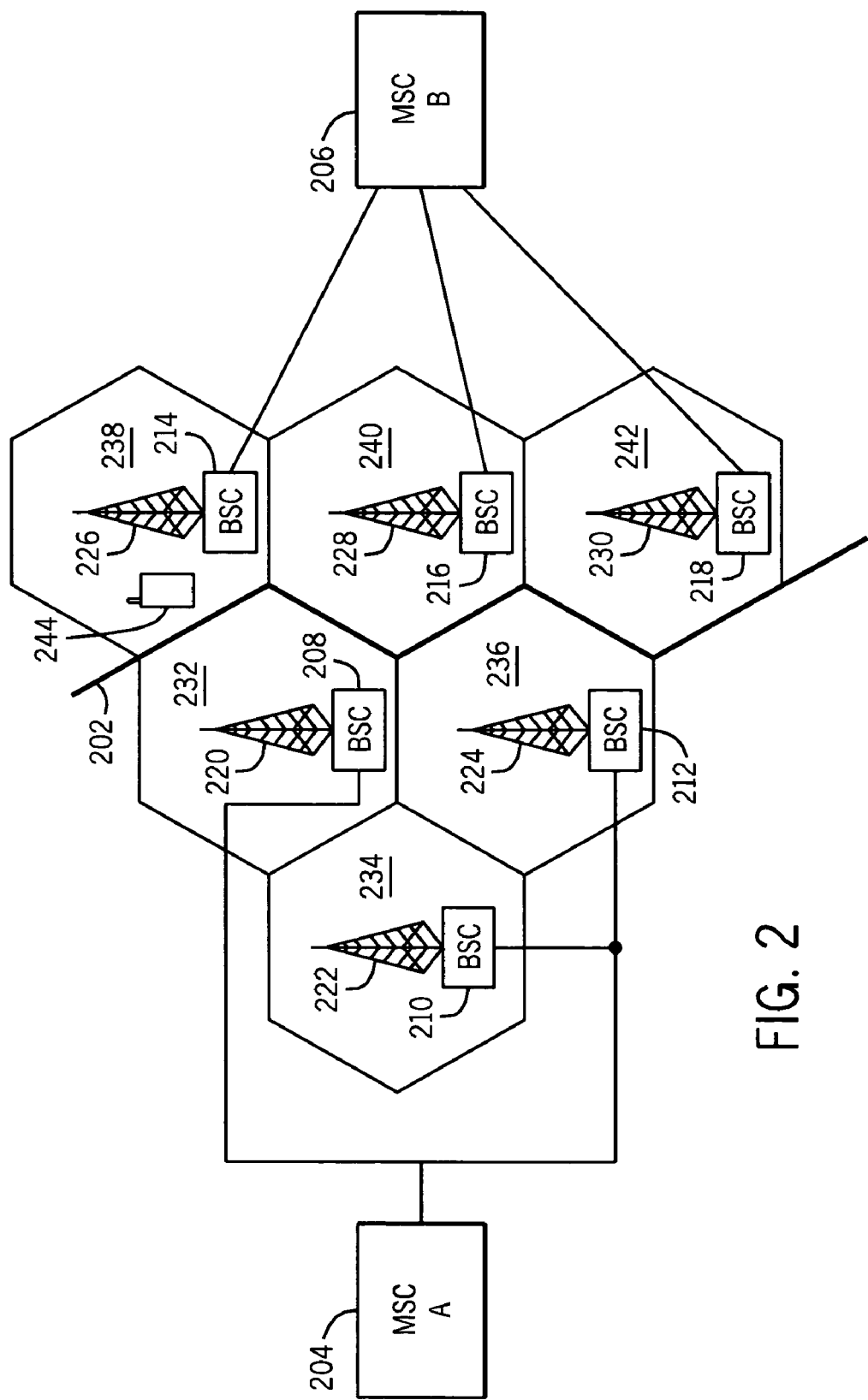
FIG. 2 illustrates a cellular telecommunications system having multiple MSCs.

FIG. 2 depicts a cellular telecommunications system having multiple MSCs 204, 206. MSC A 204 serves cells 232, 234, and 236, while MSC B 206 serves cells 238, 240, and 242. Of course, the system depicted may include a much larger number of cells is actual practice. Each MSC is depicted as serving only three cells for the sake of simplicity. A dark line 202 in the drawing figure symbolically represents the border region between cells served by MSC A 204 and MSC B 206.

MSC A 204 is in communication with base station controllers (BSCs) 208, 210, and 212 located in cells 232, 234, and 236, respectively. Similarly, MSC B 206 communicates with BSCs 214, 216, and 218, disposed within cells 238, 240, and 242, respectively. Each cell includes at least one cellular antenna structure, such as tower 222, much as described above with regard to the system depicted in FIG. 1.

Studies have shown that the majority of mobile phones served by an MSC are stationary at any given time, and that the phones tend to be stationary in the same place each day. Studies have also shown that the majority of phones that get page responses via the ISPAGE mechanism will continue to get page responses via ISPAGE. This is because these mobile phone users happen to live or work near an MSC border 202. As noted above, mobiles near an MSC border 202 tend to toggle between each MSC. Calls will be delivered to the last seen MSC, however the mobile may have toggled to its border MSC and will hence not be found until the second page via the ISPAGE mechanism. The objective of the process described herein is to optimize ISPAGE operations between MSCs, with the goal of decreasing paging resources used for call delivery and also to decrease the time required to deliver a call.

When a mobile is found in a border MSC via an ISPAGE operation, a record (specific to that mobile) is generated (or updated) indicating which MSC responded and the timestamp of the latest response. A database is generally constructed to contain records for a plurality of mobiles. Future call delivery attempts can use this information to send an ISPAGE message to that border MSC on the first page attempt. Each time a mobile is subsequently found in the same border MSC (via ISPAGE), the timestamp for that border MSC is updated. If a mobile only gets a single ISPAGE page response, the timestamp for that record will never get updated, and the record can be expunged or deleted after a suitable time interval.

For the telecommunications system depicted in FIG. 2, one may assume that cellular subscriber unit 244, currently within cell 238 but close to the border region 202, "toggles" between cell 238, which is served by MSC B 206, and cell 232, which is served by MSC A 204. This procedure has the result of finding the mobile on the first page attempt, thereby reducing the time required to deliver the call. Additionally, most mobiles that are near borders will get page messages from only one border MSC, whereas an MSC in a large metropolitan area may send second page ISPAGE messages to five to seven border MSCs, so finding the mobile on the first page attempt with one ISPAGE message eliminates the subsequent larger paging attempt. Empirical studies indicate that when an ISPAGE message is received at an MSC, the last seen cell timestamp is an effective predictor of the probability that the mobile will respond to a page.

When a mobile actually responds to an ISPAGE, an MSC entry is placed into the database corresponding to the border MSC that mobile responded from. Subsequent calls to that mobile will generate an ISPAGE to that border MSC on the first page attempt. Using this procedure has the advantage that pages to "border togglers" will complete five seconds faster, since there are five seconds between paging attempts. This results in considerable saving of paging channel occupancy.

Figure 3:
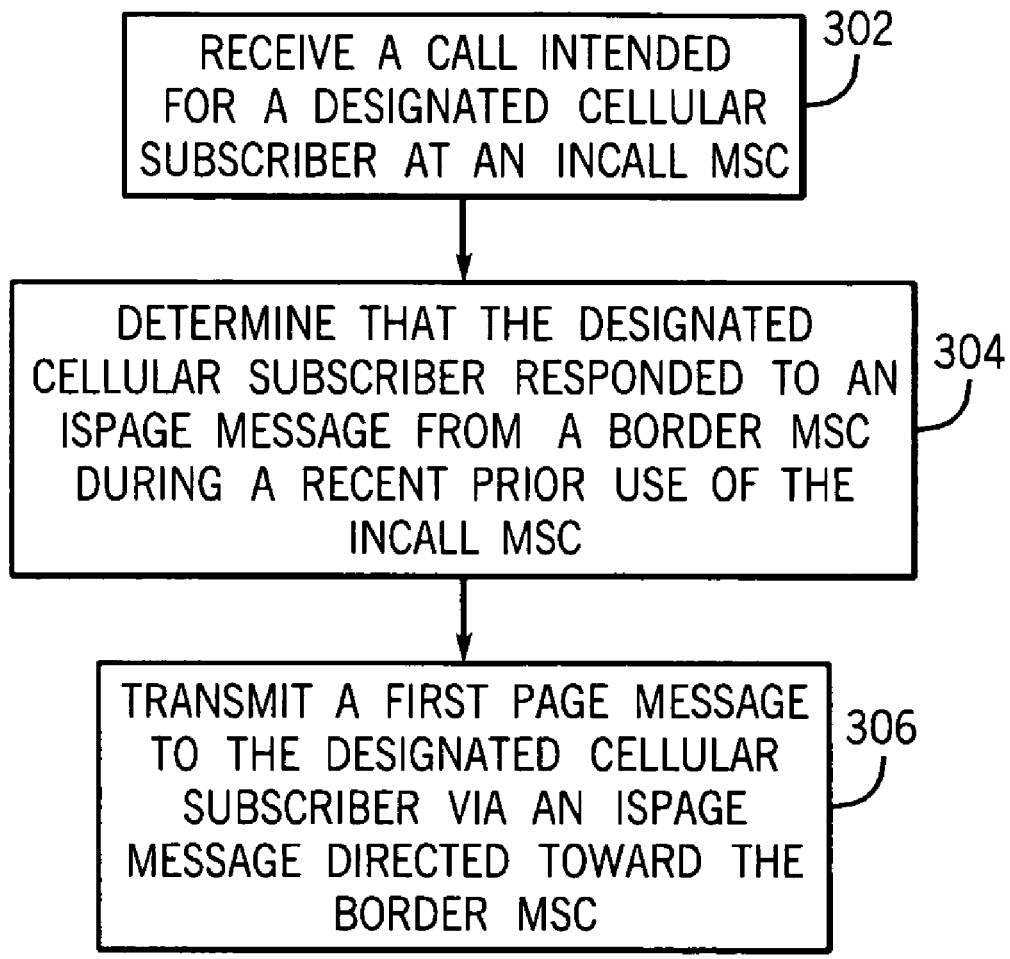
FIG. 3 is a flowchart of a process for paging an intended call recipient.

FIG. 3 is a flowchart of a method for conserving paging resources. In step 302, a call is received at a serving MSC intended for a designated cellular subscriber unit. In the subsequent operation (304), the serving MSC determines that the designated cellular subscriber responded to an ISPAGE message from a border MSC during a recent prior use. Consequently, in the step 306, the serving MSC transmits a first page message to the designated cellular subscriber via an ISPAGE message directed toward that border MSC.

In practice, cellular telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a differing order, or steps may be added, deleted, or modified.

Although examples of implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:
1. A method comprising the steps of:
   a) receiving a call intended for a designated cellular subscriber unit at a serving MSC having a plurality of border MSCs;
   (b) accessing records of responses to previous Intersystem Pages at the serving MSC that reflect prior uses of the sewing MSC;
   (c) determining from the records that the designated cellular subscriber unit, during a recent prior use of the serving MSC, responded to an Intersystem Page (ISPAGE) message from one of the plurality of border MSC identified from the records;
   (d) transmitting, on a first page attempt to the designated cellular subscriber unit via, the Serving MSC, an ISPAGE message directed toward said identified border MSC;
   wherein the step (c) of determining from the records that the designated cellular subscriber unit, during a recent prior use of the serving MSC, responded to an Intersystem Page (ISPAGE) message further comprises the step of accessing a database that identifies cellular subscriber units that responded to an ISPAGE message from a border MSC.

2. The method in accordance with claim 1, wherein the database comprises a set of records identifying cellular subscriber units that responded to an ISPAGE message in a border MSC, and wherein each record includes identifying indicia for the cellular subscriber unit, and identifying indicia for the MSC in which the cellular subscriber unit last responded.

3. The method in accordance with claim 2, wherein each record further comprises a timestamp indicating date and time of last response.

4. The method in accordance with claim 2, wherein the MSC in which the cellular subscriber unit responded is a border MSC of the serving MSC.

5. The method in accordance with claim 3, wherein records are purged from the database periodically, based, at least in part, upon age of the timestamp indicating date and time of last response.

6. The method in accordance with claim 5, wherein records are purged from the database when the timestamp indicates that the record is more than provisionable number of days old.

7. The method in accordance with claim 6, wherein the provisionable number of days comprises one day.

8. A method comprising the steps of:
   (a) receiving a call intended for a designated cellular subscriber unit at a serving MSC having a plurality of border MSCs;
   (b) accessing records of responses to previous Intersystem Pages at the serving MSC that reflect prior uses of the serving MSC;
   (c) determining from the records that the designated cellular subscriber unit, during a recent prior use of the serving MSC, responded to an Intersystem Page (ISPAGE) message from one of the plurality of border MSC identified from the records by accessing a database that Identifies cellular subscriber units that responded to an ISPAGE message from a border MSC; and
   (d) transmitting, on a first page attempt to the designated cellular subscriber unit via The serving MSC, an ISPAGE message directed toward said identified border MSC.

9. The method in accordance with claim 8, wherein each record includes identifying indicia for the cellular subscriber unit, and identifying indicia for the MSC in which the cellular subscriber unit last responded.

10. The method in accordance with claim 9, wherein each record further comprises a timestamp indicating date and time of last response.

11. The method in accordance with claim 9, wherein the MSC in which the cellular subscriber unit responded is a border MSC of the serving MSC.

12. The method in accordance with claim 10, wherein records are purged from the database periodically, based, at least in part, upon age of the timestamp indicating date and time of last response.

13. The method in accordance with claim 12, wherein records are purged from the database when the timestamp indicates that the record is more than a provisionable number of days old.

14. The method in accordance with claim 13, wherein the provisionable number of days comprises one day.

15. An apparatus comprising:
   means for receiving a call intended for a designated cellular subscriber unit at a serving MSC having a plurality of border MSCs;
   means for accessing records of responses to previous Intersystem Pages that reflect prior uses of the serving MSC;
   means for determining from the records that the designated cellular subscriber unit, during a recent prior use of the serving MSC, responded to an Intersystem Page (ISPAGE) message from one of the plurality of border MSC identified from the records; and
   means for transmitting, on a first page attempt to the designated cellular subscriber unit, an ISPAGE message directed toward said identified border MSC;
   wherein the means for determining from the records that the designated cellular subscriber unit, during a recent prior use of the serving MSC, responded to an Intersystem Page (ISPAGE) message further comprises means for accessing a database that identifies cellular subscriber units that responded to an ISPAGE message from a border MSC.

16. The apparatus of claim 15, wherein the database comprises a set of records identifying cellular subscriber units that responded to an ISPAGE message in a border MSC, and wherein each record includes identifying indicia for the cellular subscriber unit, and identifying indicia for the MSC in which the cellular subscriber unit last responded.

17. The apparatus of claim 16, wherein each record further comprises a timestamp indicating date and time of last response.

18. The apparatus of claim 16, wherein the MSC in which the cellular subscriber unit responded is a border MSC of the serving MSC.

19. The apparatus of claim 17, wherein records are purged from the database periodically, based, at least in part, upon age of the timestamp indicating date and time of last response.

20. The apparatus of claim 19, wherein records are purged from the database when the timestamp indicates that the record is more than a provisionable number of days old.

21. The apparatus of claim 20, wherein the provisionable number of days comprises one day.

22. The method of claim 1, wherein the designated cellular subscriber unit is stationary and in a same place each day.

23. The method of claim 3, wherein the timestamp is a predictor of a probability that the designated cellular subscriber unit will respond to a page.

* * * * *